United States Patent
Liu

(10) Patent No.: US 11,374,292 B2
(45) Date of Patent: Jun. 28, 2022

(54) TOGGLE ELECTRODE AND BATTERY ASSEMBLY COMPRISING THE SAME

(71) Applicant: Shenzhen Eigate Technology Co., Ltd., Shenzhen (CN)

(72) Inventor: Tuanfang Liu, Shenzhen (CN)

(73) Assignee: SHENZHEN EIGATE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/024,643

(22) Filed: Sep. 17, 2020

(65) Prior Publication Data

US 2021/0218007 A1    Jul. 15, 2021

(30) Foreign Application Priority Data

Jan. 15, 2020 (CN) .......................... 202010046444.4
Jan. 15, 2020 (CN) .......................... 202020091187.1

(51) Int. Cl.
*H01M 10/42* (2006.01)
*H01M 50/543* (2021.01)

(52) U.S. Cl.
CPC ..... *H01M 50/543* (2021.01); *H01M 10/4214* (2013.01)

(58) Field of Classification Search
CPC ............... H01M 10/42; H01M 50/296; H01M 10/4214; H01M 10/48; H01M 10/425; H01M 50/247; H01M 50/543; H01M 50/502; H01M 50/269
See application file for complete search history.

(56) References Cited

U.S. PATENT DOCUMENTS

| | | | |
|---|---|---|---|
| 2007/0133802 A1* | 6/2007 | Yuan | G07C 9/33 380/264 |
| 2015/0094914 A1* | 4/2015 | Abreu | B60H 1/00742 701/1 |
| 2016/0000145 A1* | 1/2016 | Liu | A24F 40/40 131/329 |
| 2018/0013175 A1* | 1/2018 | Liu | A24F 40/40 |
| 2019/0029324 A1* | 1/2019 | Liu | H05B 1/0227 |
| 2019/0131599 A1* | 5/2019 | Yang | H01M 50/247 |

FOREIGN PATENT DOCUMENTS

WO         2015196331 A1    12/2015
WO     WO2015196331        * 12/2015

OTHER PUBLICATIONS

WO2015196331 MT (Year: 2015).*
KR 2018056599 to Bae (Abstract) (Year: 2018).*

* cited by examiner

*Primary Examiner* — Alexander Usyatinsky
(74) *Attorney, Agent, or Firm* — Matthias Scholl P.C.; Matthias Scholl

(57) ABSTRACT

A toggle electrode disposed on the bottom end of a battery assembly. The toggle electrode includes a rotating shaft and a toggle. The battery assembly includes a negative terminal of an input end soldered on the rotating shaft and a battery. The rotating shaft is connected to the toggle. The toggle is rotatable around the battery to contact or not contact the negative terminal of the battery. When the toggle is not in contact with the negative terminal of the battery, the battery is removable for replacement. The toggle is in contact with the negative terminal of the battery for electric conduction.

4 Claims, 3 Drawing Sheets

TOGGLE ELECTRODE AND BATTERY ASSEMBLY COMPRISING IHE SAME

CROSS-REFERENCE TO RELATED APPLICATIONS

Pursuant to 35 U.S.C. § 119 and the Paris Convention Treaty, this application claims foreign priority to Chinese Patent Application No. 202010046444.4 filed Jan. 15, 2020, and to Chinese Patent Application No. 202020091187.1 filed Jan. 15, 2020. The contents of all of the aforementioned applications, including any intervening amendments thereto, are incorporated herein by reference.

BACKGROUND

The disclosure relates to a toggle electrode and a battery assembly comprising the same.

The electrodes of a conventional battery assembly are fixed on the battery. This leads to difficulty in replacing the battery.

SUMMARY

The disclosure provides a toggle electrode disposed on the bottom end of a battery assembly. The toggle electrode comprises a rotating shaft and a toggle; the battery assembly comprises a negative terminal of an input end soldered on the rotating shaft and a battery; the rotating shaft is connected to the toggle; the toggle is rotatable around the battery to contact or not contact the negative terminal of the battery; when the toggle is not in contact with the negative terminal of the battery, the battery is removable for replacement; and the toggle is in contact with the negative terminal of the battery for electric conduction.

The toggle electrode further comprises a bottom cover comprising a location slot, a steel ball, and a spring; the spring is disposed in the location slot to support the steel ball; the steel ball is disposed on the spring and fixed in the location slot to position a moving rail of the toggle; the toggle is disposed on the bottom cover; the toggle is fixed on the rotating shaft and is movable horizontally with respect to the bottom cover to connect to the battery assembly.

The disclosure also provides a battery assembly comprising the aforesaid toggle electrode.

The battery assembly further comprises a control panel and a mirror; the mirror is disposed on an LCD screen of the control panel, and functional information displayed on the LCD screen is refracted into the mirror.

The battery assembly further comprises a power switch and a function button; the battery comprises an output end connected to an input end of the control panel to supply the control panel; the function button is disposed on the control panel to adjust an output power of the battery; the power switch is disposed on the control panel; and when in use, continuously pressing the power switch five times to connect or disconnect the battery.

The battery assembly of the disclosure comprises a toggle electrode disposed on the bottom end of the battery assembly. The toggle is rotatable around the battery assembly to contact or not contact the negative terminal of the battery assembly. When the toggle is in contact with the negative terminal of the battery, the circuit of the battery is put through and the toggle functions as the negative terminal of the battery assembly. The battery assembly is provided with a multi-functional control component, which can control the power, switch on or off, and the output of the battery, and display the function information.

DETAILED DESCRIPTION

To further illustrate, embodiments detailing a toggle electrode and a battery assembly comprising the same are described below. It should be noted that the following embodiments are intended to describe and not to limit the disclosure.

Figure 1:
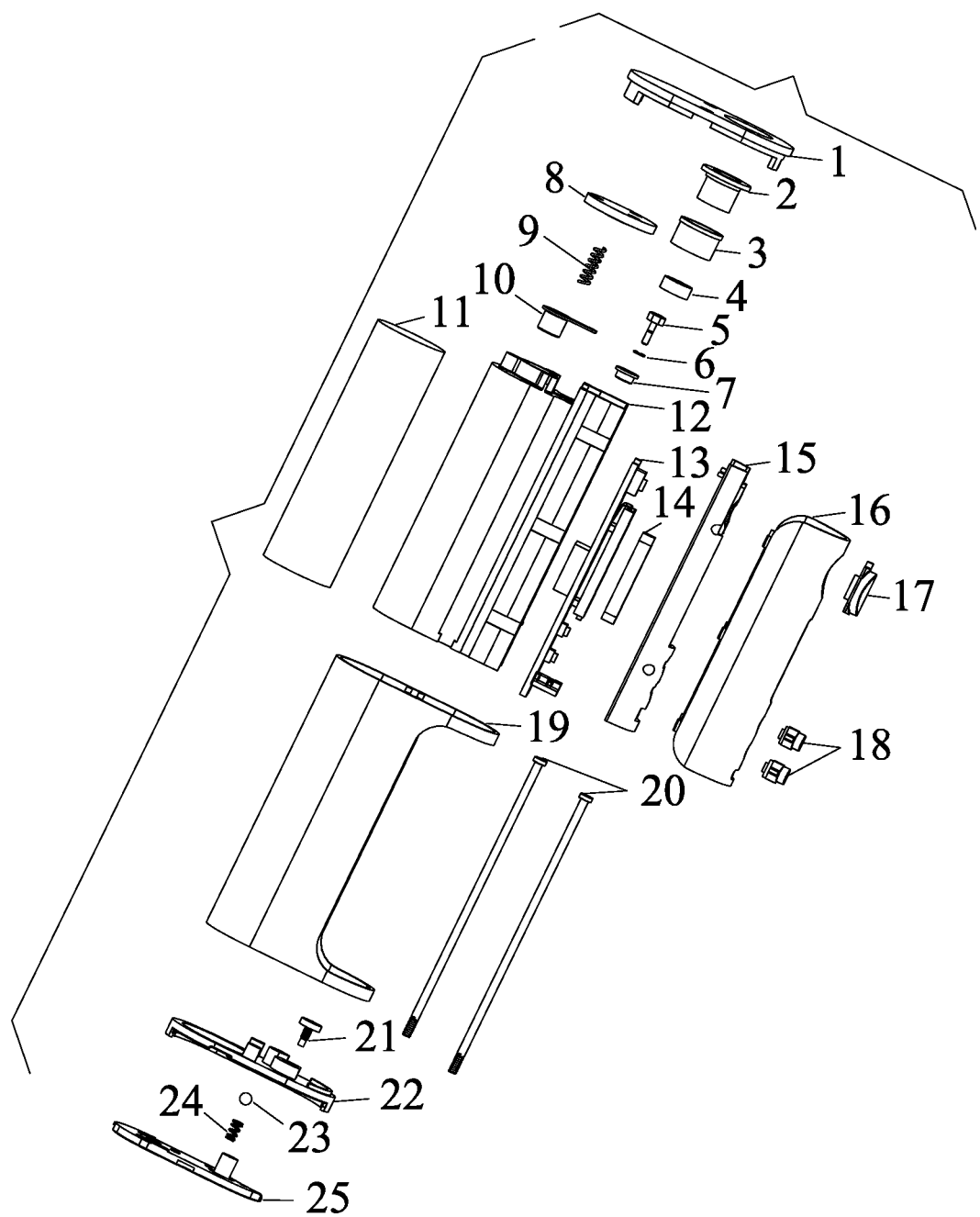
FIG. 1 is an exploded view of a battery assembly according to one embodiment of the disclosure.
Figure 2:
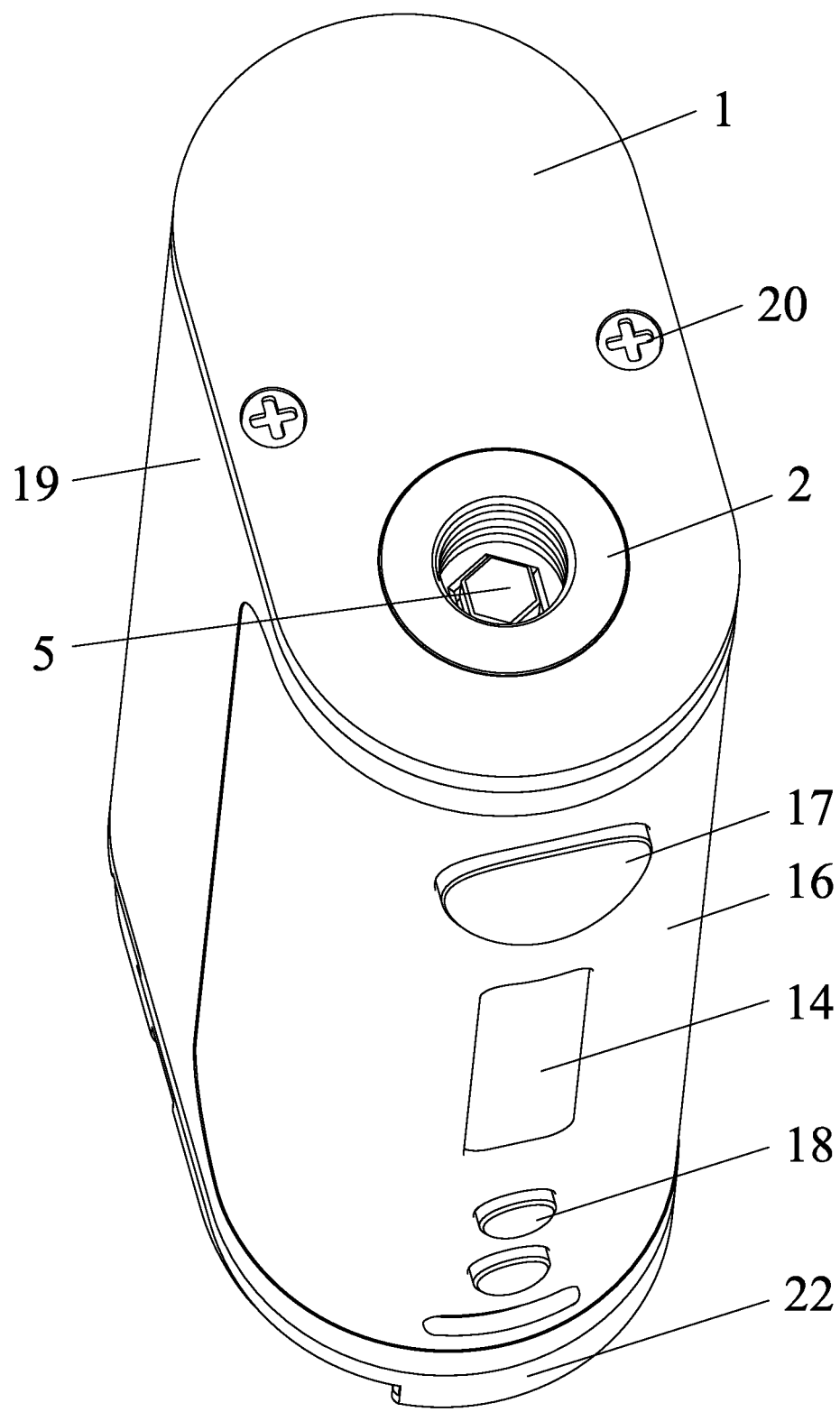
FIG. 2 is a schematic diagram of a battery assembly according to one embodiment of the disclosure.
Figure 3:
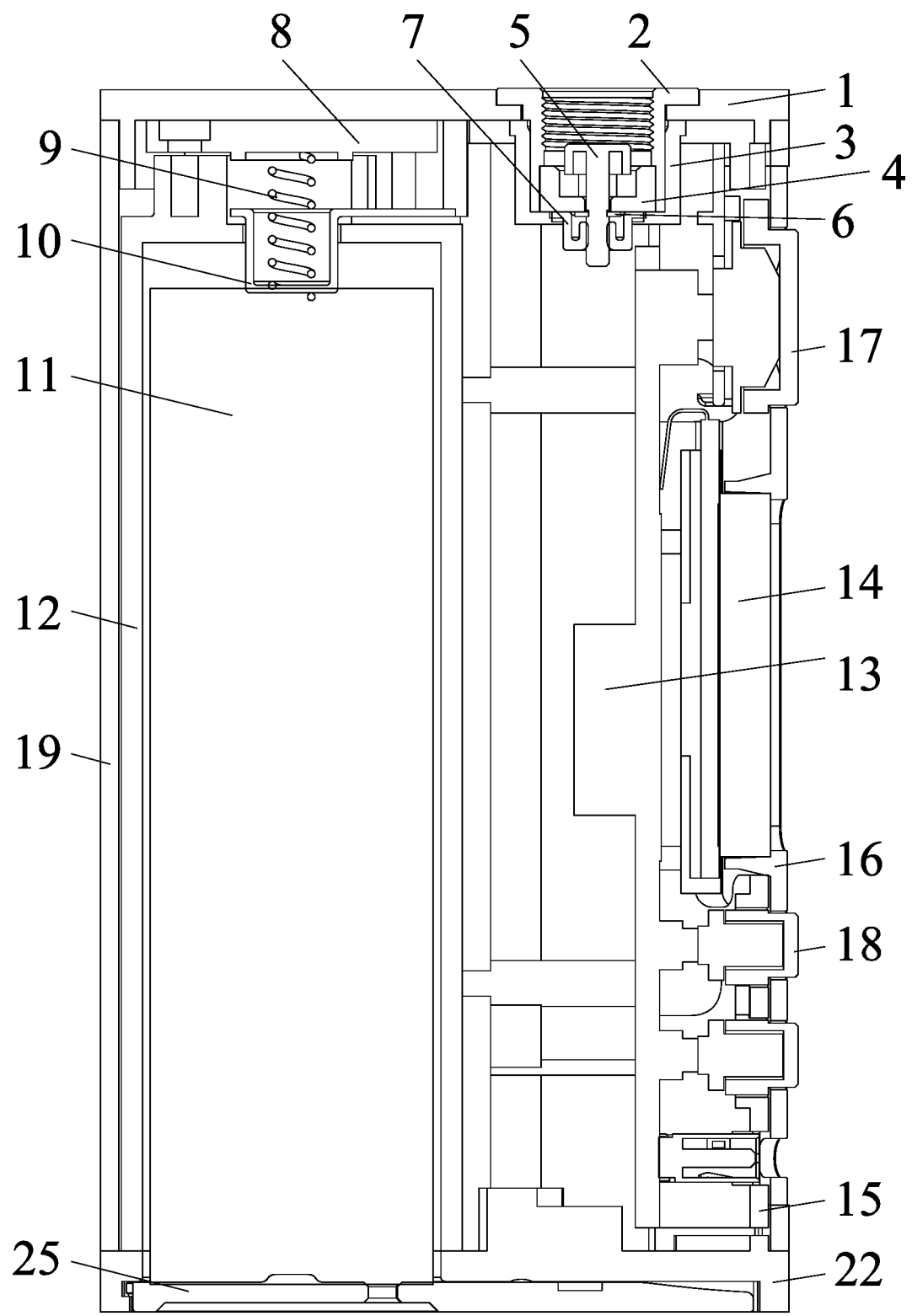
FIG. 3 is a sectional view of a battery assembly according to one embodiment of the disclosure.

As shown in FIGS. 1-3, the disclosure provides a battery assembly, comprising a top cover 1, a copper threaded ring 2, a negative copper ring 3, an insulation ring 4, an electrode 5, a circlip 6, a silicone seal 7, an upper cover 8, an inner spring 9, a copper cup 10, a battery 11, a first support 12, a control panel 13, a mirror 14, a second support 15, a face cover 16, a power switch 17, a function button 18, a housing 19, a bolt 20, a rotating shaft 21, a bottom cover 22, a steel ball 23, a spring 24, and a toggle 25. The circlip 6 and the silicone seal 7 are disposed around the electrode 5. The electrode 5 is disposed in the insulation ring 4 and is soldered on the positive terminal of the input end of the control panel 13. The insulation ring 4 is disposed on the copper threaded ring 2. The copper threaded ring 2 is disposed in the negative copper ring 3. The negative copper ring 3 is soldered on the negative terminal of the input end of the control panel 13. The control panel 13 is disposed on the first support 12. The positive terminal of the input end of the control panel is soldered on the copper cup 10. The upper cover 8 is disposed on the first support 12. The battery 11 is disposed on the first support 12 and the positive terminal of the output end of the battery is connected to the copper cup 10. The power switch 17 is disposed on the control panel 13. The mirror 14 is disposed on an LCD screen of the control panel 13. The function button 18 is disposed on the control panel 13 to adjust an output power of the battery. The second support 15 covers the control panel 13 to fix the mirror 14 and the buttons. The first support 12 is disposed in the housing 19. The spring 24 is disposed in the location slot to support the steel ball 23; the steel ball 23 is disposed on the spring 24 and fixed in the location slot. The toggle 25 is fixed on the rotating shaft 21 and is movable horizontally with respect to the bottom cover. The negative terminal of the input end of the control panel 13 is soldered on the rotating shaft 21. The bottom cover 22 is disposed on the bottom end of the housing 19. The top cover 1 is disposed on the top end of the housing 19. The bolt 20 is fixed on the housing 19. The face cover 16 is disposed on the surface of the housing.

The battery assembly of the disclosure comprises a toggle electrode disposed on the bottom end of the battery assembly. The toggle is rotatable around the battery assembly to contact or not contact the negative terminal of the battery assembly. When the toggle is in contact with the negative terminal of the battery, the circuit of the battery is put through and the toggle functions as the negative terminal of the battery assembly. The battery assembly is provided with a multi-functional control component, which can control the power, switch on or off, and the output of the battery, and display the function information.

It will be obvious to those skilled in the art that changes and modifications may be made, and therefore, the aim in the appended claims is to cover all such changes and modifications.

What is claimed is:

1. A battery assembly, comprising:
   a battery comprising an output end having a negative terminal;
   a toggle electrode comprising a rotating shaft and a toggle; and
   a control panel comprising an input end having a negative terminal; wherein:
   the toggle electrode is disposed on a bottom end of the battery assembly;
   the negative terminal of the input end of the control panel is soldered on the rotating shaft;
   the toggle is fixed on the rotating shaft and is rotatable around the battery to contact or not contact the negative terminal of the battery; and
   when the toggle is not in contact with the negative terminal of the battery, the battery is removable for replacement; and when the toggle is in contact with the negative terminal of the battery, the negative terminal of the battery is electrically connected to the negative terminal of the input end of the control panel through the toggle and the rotating shaft for electrical conduction.

2. The battery assembly of claim 1, further comprising a bottom cover comprising a location slot, a steel ball, and a spring, wherein the spring is disposed in the location slot to support the steel ball; the steel ball is disposed on the spring and fixed in the location slot to position a moving rail of the toggle; the toggle is disposed on the bottom cover; the toggle is movable horizontally with respect to the bottom cover to connect to or disconnect from the battery assembly.

3. The battery assembly of claim 2, further comprising a mirror, wherein the mirror is disposed on an LCD screen of the control panel, and functional information displayed on the LCD screen is refracted into the mirror.

4. The battery assembly of claim 3, further comprising a power switch and a function button; wherein the output end of the battery is connected to the input end of the control panel to supply power to the control panel; the function button is disposed on the control panel to adjust an output power of the battery; the power switch is disposed on the control panel; and when in use, continuously pressing the power switch five times to connect or disconnect the battery.

* * * * *